Oct. 14, 1930.    R. F. METCALFE    1,778,198
SAFETY LIQUID FEED
Original Filed May 14, 1925    2 Sheets-Sheet 2

Inventor
Robert F. Metcalfe
By his Attorney

Patented Oct. 14, 1930

1,778,198

UNITED STATES PATENT OFFICE

ROBERT F. METCALFE, OF BROOKLYN, NEW YORK, ASSIGNOR TO SOCONY BURNER CORPORATION, OF NEW YORK, N. Y., A CORPORATION OF DELAWARE

SAFETY LIQUID FEED

Original application filed May 14, 1925, Serial No. 30,312. Divided and this application filed December 23, 1925. Serial No. 77,324.

This invention relates to a control device adapted to govern the flow of a liquid through a conduit system. In particular the invention relates to a novel and improved safety device which will control the stopping of the flow of liquid in the event conditions of flow become abnormal.

The preferred application of this improved control device is made, for purposes of disclosure, in connection with an oil burner adapted to heat dwellings, office buildings, factories and certain manufacturing agencies such as heat treatment furnaces and the like. If normal fuel flow conditions exist this improved safety device does not become effective to stop the flow, but should an insufficient supply of oil or an excess quantity of oil be supplied then the safety device operates to shut down the demand for the oil. In addition, this device preferably includes means for regulating the normal flow of liquid through the conduit system or burner although the means for controlling the normal flow may be separate.

This improved safety device formed a part of my application for Letters Patent S. N. 30,312, filed May 14th, 1925, and is divided therefrom.

While the particular installation of this invention is described in connection with an oil burner, it will be understood that this novel control device may be employed in any conduit system through which a liquid flows and in which it is desired to have a safety mechanism for controlling the stoppage of the flow of fuel as well as having means for regulating the normal flow of the liquid. As applied to the oil burner, and as an example, the safety device herein prevents the starting of the burner when the flow of the oil would be so small as to create an explosive mixture with the air normally supplied, or should the conduit system be flooded and overflow, the safety device functions to prevent the starting of the burner thereby eliminating the danger of igniting the oil which has overflowed.

The safety portion of this improved device may if desired be responsive to other undesirable conditions of operations for modifying the control of the fuel or liquid through the system.

The main object of this invention is to provide a novel and improved safety device to be incorporated in a conduit system adapted to conduct liquid from a suitable supply thereof to a suitable consuming apparatus therefor.

A further object of the invention is to provide such a novel regulating device in a liquid conduit system as will govern the normal flow of liquid through said system and will also act to stop the flow of liquid in said system when abnormal conditions of flow of liquid exists in the system.

The particular object of this invention is to provide a novel controlling device for governing the flow of liquid fuel from the source of supply thereof to a liquid burner and to provide within this controlling device suitable means for governing the normal flow of fuel therethrough and to govern the flow of fuel when abnormal conditions of the flow exists.

Other objects and advantages will become apparent when the detailed description of this improved device is read.

The preferred embodiment of this invention is illustrated in the accompanying drawings wherein.

Figure 1:
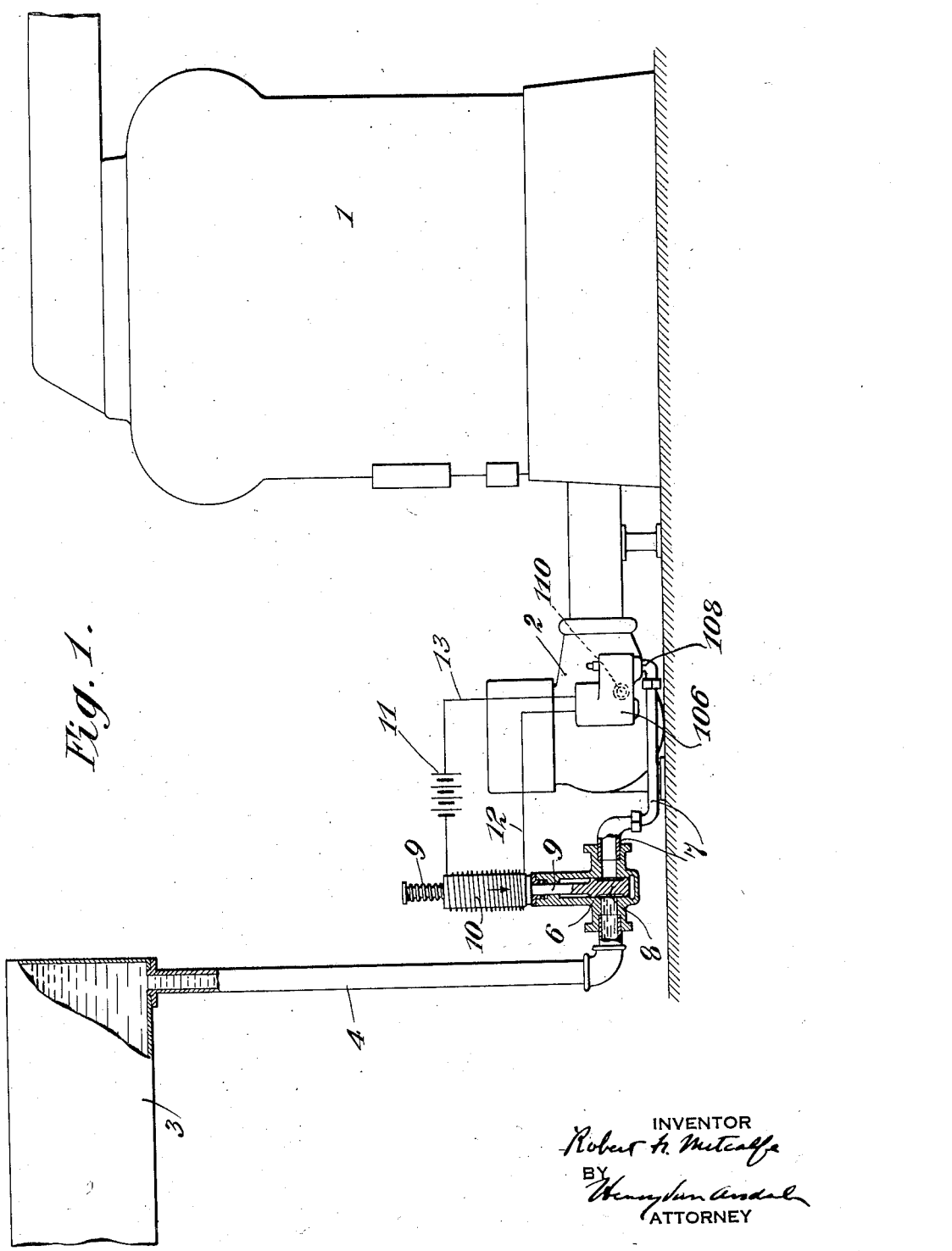
Fig. 1 is a diagrammatic view showing my improved control device associated with a liquid fuel burner and a fuel conduit system.
Figure 2:
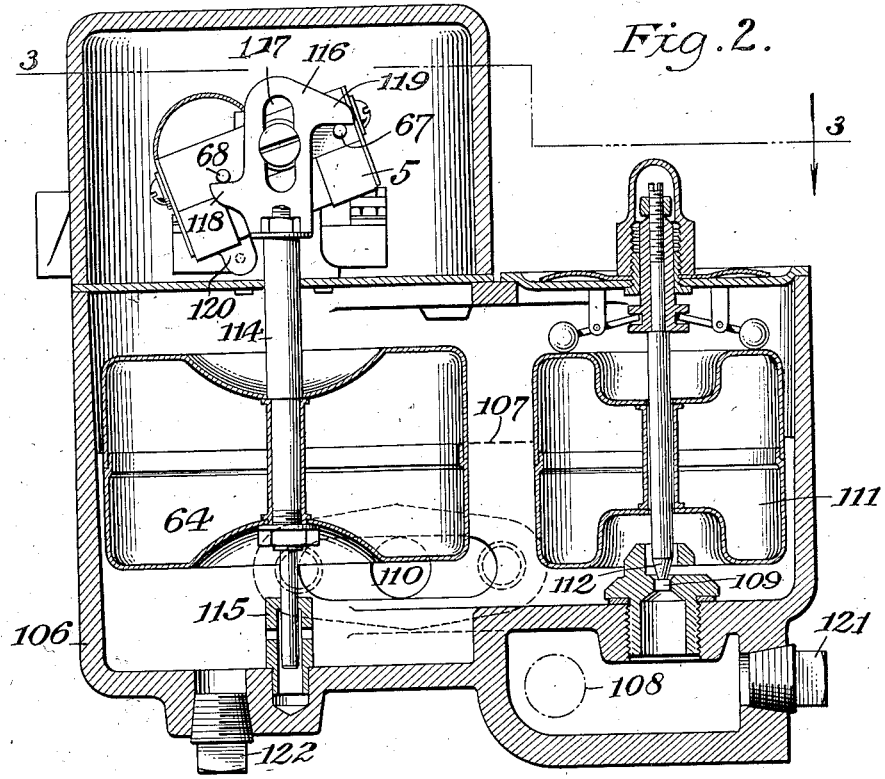
Fig. 2 is a sectional view of the safety device showing the control for the normal flow of liquid and showing a control for stopping the flow of fuel through the system. This figure is taken on lines 2—2 of Fig. 3.
Figure 3:
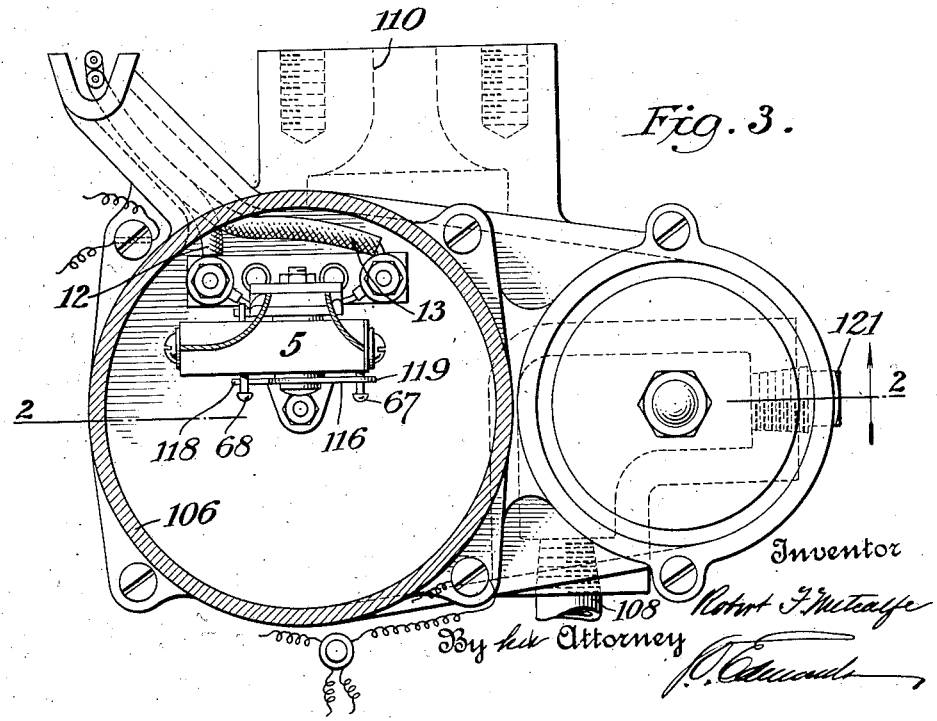
Fig. 3 is a sectional view of the improved device shown in Fig. 2 taken on the line 3—3 thereof.

For satisfactorily disclosing the principles of this invention there is shown in Fig. 1 a furnace 1 of the ordinary hot water or steam type and an oil burner 2 associated therewith in the usual manner. The fuel supply system may comprise a tank 3 connected to the burner 2 by means of a supply pipe 4, valve 6 and inlet pipe 7. It will be understood however, that any means of supply may be used within the purview of this invention and that the diagrammatic showing in Fig. 1 is for purposes of illustration only. My safety device is so designed as to close the valve 6, shutting off the supply of oil to the burner when the flow to the burner parts is so small as to create an explosive mixture with the air normally supplied or when the burner parts should become flooded. My valve may be of the well known single gate type having the closure portion 8 secured to stem portion 9. Stem portion 9 also forms the core piece of the electric-magnet 10. The electro-magnet 10 operates to normally hold the closure portion 8 in raised and open position, current being supplied thereto from a suitable power source such as a battery 11. My switch device 5, shown more particularly in Figs. 2 and 3 and contained within a frame 106 may be connected by wires 12 and 13 in electric circuit with the battery 11 and electro-magnet 10. Now it is seen that when switch 5 is closed the closure portion 8 is normally held in raised position permitting a free flow of fuel from the tank 3 to the burner 2. Closure portion 8 drops to close the valve when the switch 5 is opened.

My improved device preferably consists of a frame 106 considered as a reservoir or bowl which receives the liquid or fuel passing through the conduit system and which liquid normally assumes level 107 in such reservoir. The fuel preferably enters this device by pipe 108 and passes to the reservoir 106 through a suitable valve 109. The fuel or liquid passes from the reservoir by flowing through pipe 110. A suitable float 111 and the usual operating means responsive to the position of the float 111 vary the position of rod 112 to open or close the valve. The float 64 is shown to the left of the float 111 and is adapted to move in accordance with the position of the level of the fuel. This float 64 carries a suitable shaft 114 which is guided at its lower end by some means such as frame 115 and at its top end it carries a plate 116. This plate is provided with a slot 117 and with arms 118 and 119 which are respectively adapted to engage suitable stops 68 and 67 carried by the switch 5. A suitable amount of lost motion may be provided between the movements of the float 64 and the actual opening of the switch. This lost motion may be in the switch wherein the mercury therein is required to be moved a certain amount before the switch opens, or the lost motion may be between the stops 67 and 68 and the arms 118 and 119. In this disclosure the lost motion is in the switch. By reference to application S. N. 30,312, filed May 14, 1925, above noted, the switch 5 is provided with contacts and a desirable amount of mercury within the reservoir or container 120. This mercury is adapted to be moved to connect the contacts thereby closing the switch. As the switch is moved, the mercury changes position so that it is in engagement with only one of the contacts thereby causing the switch 5 to open. The opening and closing of the switch is accomplished within the container 120 which is completely closed thus eliminating fire hazards.

It will be noted that when the level of the fuel rises too high in reservoir 106 that projection 118 engages stop 68 and moves the switch 5 to its open position. When the level of the fuel lowers, the float 64 will drop causing extension 119 to engage stop 67 thereby moving the switch 5 to its open position. The construction of this particular type of safety device is simple and permits satisfactory normal operation, but prevents the operation of the burner when abnormal fuel feed conditions, or flow thereof, exist. A satisfactory means for cleaning the fuel feed chamber is provided by suitable stoppers 121 and 122 which are readily removed.

While the foregoing description applies to the device as incorporated in a liquid fuel burner it will be understood that the device will function normally to control the flow of liquid through the conduit system by reason of the raising and lowering of float 111 thereby controlling the opening and closing of valve 109. Should this valve 109 become fouled by dirt or other material so that the valve will not fully seat, the liquid would flow into the reservoir but would not pass therefrom through pipe 110 in sufficient quantities and consequently the reservoir would overflow and cause danger. To overcome this disadvantage the float 64 is provided and is arranged to raise and lower in accordance with the level of the liquid in the reservoir. The normal operation of this float 64 is to vary a control means, such for example as the closure portion 8 of valve 6 which governs the flow of the liquid from its source of supply to the apparatus consuming the same. In this disclosure there is provided the electrical switch 5 which is connected in an electrical control system of the operating device and when either abnormal high level or abnormal low level exists the switch 5 is opened thereby opening the circuit of the apparatus, permitting the closure portion 8 of valve 6 to close, thus stopping the flow of liquid fuel to the burner through the conduit system. Any particular substitute form of apparatus may be employed for connecting the float 64 to the switch 5. The apparatus heretofore described has proven satisfactory for accomplishing this purpose.

It will be seen from the foregoing disclosure and particular description of the apparatus that a most satisfactory device has been provided for controlling the normal flow of liquid thorugh a liquid conduit system and for controlling the stoppage of the flow of the liquid when there is abnormal condition of flow in the system. The apparatus for accomplishing these desirable results is simple, of small number of operating parts and its construction provides for the automatic operation of the device to prevent dangers of destruction of property and when employed in an oil burner apparatus also eliminates fire hazards.

It will be understood that while I have herein described in detail a particular embodiment of my invention for purposes of full disclosures, and some detailed features which I am specifically claiming for a special advantage, many changes and modifications may be made in the particular construction and arrangement of parts without departing from the broad scope of my invention which is outlined in the subjoined claims.

I claim:

1. In a hydrocarbon burner, the combination of fuel supply means, a chamber for receiving predetermined amounts of said fuel, a float carried in said chamber, an electrical switch located in juxta-position to said float, and means associated with said float including a plate positioned to engage parts of said switch for automatically opening said switch when there is high or low abnormal variations from the normal level of said fuel in said chamber.

2. In a hydrocarbon burner, the combination of fuel supply means, a chamber for receiving a predetermined amount of said fuel, a float carried in said chamber, an electrical switch located in juxta-position to said float, a stem carried by said float, and a plate mounted on said stem and positioned to engage parts of said switch either upon abnormal high fuel level in said chamber or upon abnormal low fuel level in said chamber.

3. In a device for regulating the passage of liquid through a liquid conduit system, the combination of a float regulating means for governing the normal flow of liquid through said system, and a second float responsive means separate from the first float means and responsive to the same liquid level as the first float and adapted to control the stoppage of flow of fuel when abnormal conditions exist in said system.

4. In a liquid conduit system the combination of a reservoir mounted in said system and adapted to have the liquid pass therethrough, a valve for controlling the flow of liquid into said reservoir, a float responsive to the level of liquid in said reservoir for controlling the operation of said valve, a second float in said reservoir adapted to rise and fall in accordance with the liquid level therein, an electrical switch of an electrical control circuit in juxta-position to said second float and means associated with said second float and positioned to engage parts of said switch for automatically opening said switch either upon abnormal high liquid level in said chamber or upon abnormal low liquid level in said chamber.

5. In a liquid conduit system the combination of a reservoir mounted therein through which said liquid passes, a float operated valve responsive to the level of liquid in said reservoir for controlling the normal flow of liquid in said system, a second float positioned within said reservoir and responsive to the level of liquid therein, and a switch mounted on the frame of said reservoir and being so associated with said float as to be opened thereby under abnormal conditions of liquid level within said reservoir, said switch being connected in an electrical circuit which governs the flow of liquid through said system.

6. In a liquid conduit system the combination of a reservoir mounted in said system and adapted to have the liquid thereof pass therethrough, a liquid inlet to said reservoir, a valve for controlling the flow of liquid from said inlet to said reservoir, a float responsive to the level of liquid within said reservoir, said float being associated with said valve to control the opening and closing thereof, a second float within said reservoir and positioned to be responsive to the level of liquid therein, a stem carried by said second float, an electrical switch carried by said reservoir, a plate carried by said stem and positioned to engage parts on said switch to open said switch when said second float reaches an abnormal low position or an abnormal high position.

7. In a liquid conduit system the combination of a reservoir mounted in said system and adapted to have the liquid pass therethrough, a liquid inlet to said reservoir, a valve for controlling the flow of liquid through said inlet, a float within said reservoir and moveable with the level of the liquid in said reservoir, a stem passing through said float and adapted to have relative movement therewith, the lower end of said stem forming a portion of said valve, guide means at the lower end of said stem and at the upper end of said stem for maintaining the stem in predetermined vertical position, a second float within said reservoir and positioned to be responsive to the level of liquid therein, a second stem within said reservoir and passing through said second float and being firmly affixed thereto, guide means in said reservoir for engaging and guiding the lower end of said second stem, the upper end of said stem extending through said reservoir to an electrical switch, a plate carried on the upper end of said second stem and positioned to engage parts of said switch to open the same when the fuel level in said reservoir is abnormally high or abnormally low.

This specification signed this 21st day of December, 1925.

ROBERT F. METCALFE.